(No Model.)
R. G. PETERS.
APPARATUS FOR THE MANUFACTURE OF SALT.
No. 366,026. Patented July 5, 1887.
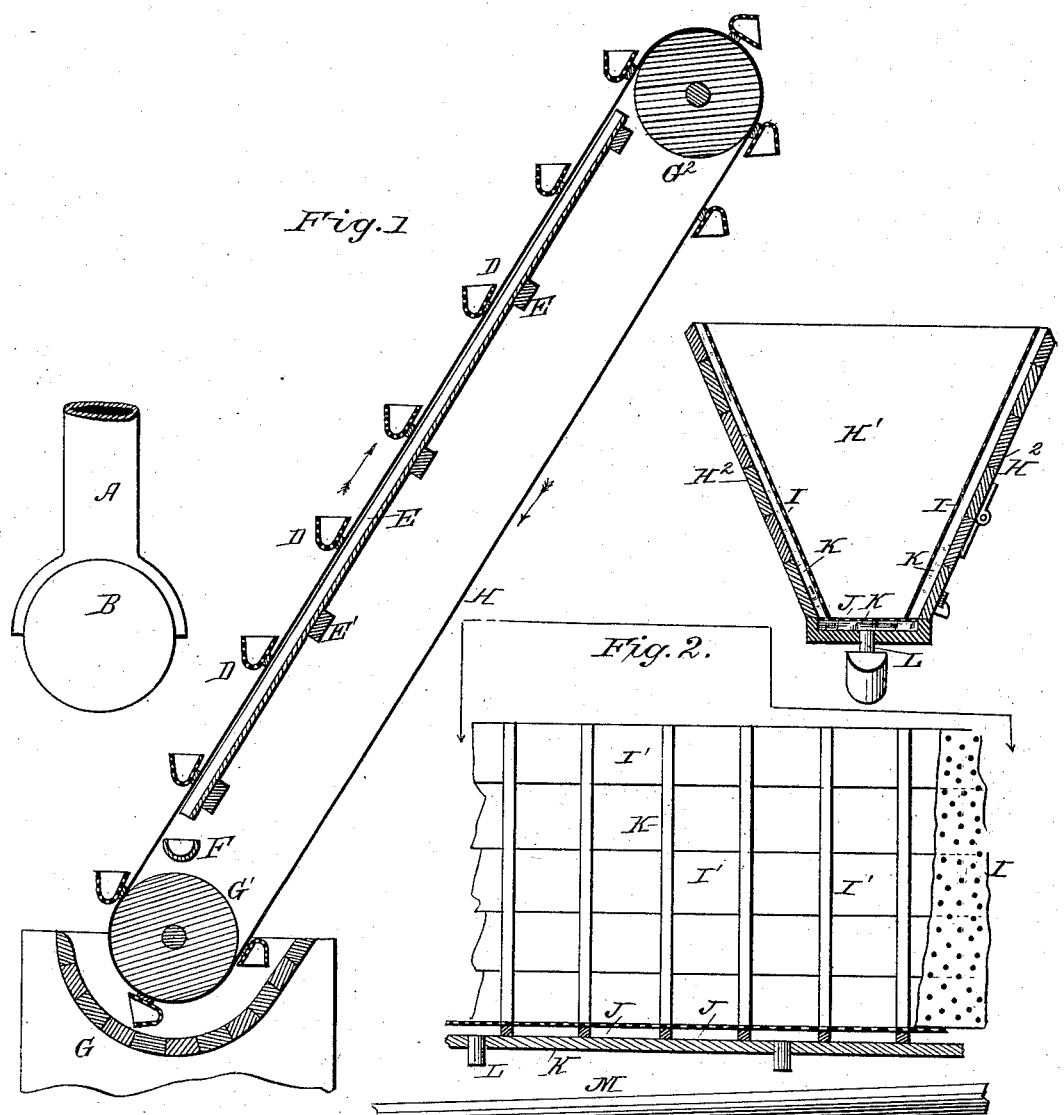
WITNESSES:
Fred G. Dieterich
P. B. Turpin
INVENTOR:
R. G. Peters
BY Munn & Co.
ATTORNEYS.

UNITED STATES PATENT OFFICE.

RICHARD G. PETERS, OF MANISTEE, MICHIGAN.

APPARATUS FOR THE MANUFACTURE OF SALT.

SPECIFICATION forming part of Letters Patent No. 366,026, dated July 5, 1887.

Application filed March 16, 1887. Serial No. 231,198. (No model.)

*To all whom it may concern:*

Be it known that I, RICHARD G. PETERS, of Manistee, in the county of Manistee and State of Michigan, have invented a new and useful Improvement in Apparatus for the Manufacture of Salt, of which the following is a specification.

My invention is an improvement in apparatus for use in the manufacture or production of salt; and it consists in certain features of construction and novel combinations of parts, all as will be hereinafter described and claimed.

In the drawings, Figure 1 is a sectional elevation of my improvements, and Fig. 2 is a partial vertical longitudinal section of the storage-bin.

Referring to the drawings by letter, the leg A, having discharge B, may be of any ordinary construction and be connected with an evaporating-tank in any suitable manner. Below the discharge of such pipe A, I arrange a waste-trough, G, into which extends the lower end of the carrier H, which is supported on and around pulleys G' G², one of which pulleys may be revolved in any suitable manner to drive the elevator, which in practice is moved in the direction indicated by the arrows, Fig. 1. The elevator-apron may be formed of chains, ropes, belts, or other suitable material. This elevator is provided with cups or buckets D, which open in the direction of movement of the elevator, or upward on the ascending portion and downward on the descending portion thereof. These cups or buckets are foraminous or perforated with a number of small openings for the passage of the brine to properly drain the precipitate. The buckets may be formed of glass, copper, tin, galvanized iron, or other metal, or silicate, or, if desired, of fine-meshed wire-cloth.

Below the ascending portion of the elevator and extended in the direction of length thereof, I support on beams E' a trough, E, which receives the drainings of brine from the buckets D and directs same downward into trough F, which may lead to a reservoir or tank, whence the brine may be pumped back into the pan.

The storage tank or trough H' is arranged below the upper end of the elevator, so the latter will discharge into such tank. I form the trough H' with an outer casing, H², and an inner lining, I, separated from such casing, to form a passage for the liquid or brine in the precipitate discharged by the elevator, the inner lining covering the sides and bottom of the interior of the trough, and being foraminous or formed with a large number of perforations, as shown. As in the case of the buckets D, the inner lining, I, may be formed of glass, copper, tin, galvanized iron, or other metal, or silicate, or, if desired, of fine-meshed wire-cloth. By preference the space between the inner lining, I, and casing H² is divided by transverse partition K, extended at J across the bottom of the trough into a number of compartments, I', each of which has a discharge at L into a trough, M, extended below the storage-trough, and which may, like trough F, lead to a receiver-tank, whence it may be pumped into the pan and again run through the apparatus.

The operation is simple and will be readily understood from the foregoing description.

The precipitate discharged into trough G is taken up by the cups or buckets of the elevator, drained in its passage up thereon, and discharged into the storage-bin, where it is further drained, as will be understood.

Having thus described my invention, what I claim as new is—

1. In an apparatus substantially as described, an elevator having ascending and descending portions and foraminated buckets, a trough below and extended in the direction of the length of the ascending portion of the elevator, and arranged and adapted to receive the drippings from the buckets, substantially as set forth.

2. The combination, substantially as described, of an elevator having foraminated cups or buckets, a trough extended below and in the direction of length of the ascending portion of such elevator, and a receiver or trough arranged to receive the discharge of said first-named trough, substantially as set forth.

3. In an apparatus substantially as described, a storage bin or trough having an inner lining perforated up along its sides, a casing separated at the sides from said inner lining, and transverse ribs interposed between said casing and lining and extended up between the sides of such casing and lining, forming the intervening space into compartments, each of which has a discharge-opening, substantially as set forth.

4. The combination of the trough G, the endless carrier extended thereinto, the foraminated buckets D, the trough E, arranged below the ascending portion of the carrier in position to receive the drip from the buckets, and the trough F, said troughs E and F being arranged between the ascending and descending portions of the carrier, substantially as set forth.

5. The improvement in apparatus, substantially as described, consisting of the elevator having foraminated cups or buckets, a trough, E, and receptacle F, and the storage-bin having an inner foraminated lining separated from its casing, substantially as and for the purposes specified.

RICHARD G. PETERS.

Witnesses:
F. H. SMITH,
J. A. PROCTOR.